US008720473B2

(12) United States Patent
Almeida et al.

(10) Patent No.: US 8,720,473 B2
(45) Date of Patent: May 13, 2014

(54) CELL FLOW TECHNOLOGY THAT PROVIDES CONTINUOUSLY VARIABLE, AND RENEWABLE, CONTINUANCE OF PRESSURE RESISTANCE

(76) Inventors: Robert Scott Almeida, Boston, MA (US); Douglas Evan Stern, Providence, RI (US)

( * ) Notice: Subject to any disclaimer, the term of this patent is extended or adjusted under 35 U.S.C. 154(b) by 79 days.

(21) Appl. No.: 13/252,331

(22) Filed: Oct. 4, 2011

(65) Prior Publication Data

US 2012/0298227 A1 Nov. 29, 2012

Related U.S. Application Data

(60) Provisional application No. 61/489,858, filed on May 25, 2011.

(51) Int. Cl.
*F16K 15/20* (2006.01)
*F16K 15/00* (2006.01)
*F16K 21/04* (2006.01)

(52) U.S. Cl.
USPC .......................................... 137/223; 137/512

(58) Field of Classification Search
USPC .......................................... 137/223, 224, 512
See application file for complete search history.

(56) References Cited

U.S. PATENT DOCUMENTS

| | | | | |
|---|---|---|---|---|
| 506,550 | A * | 10/1893 | Rosentreter | 152/337.1 |
| 2,488,382 | A * | 11/1949 | Davis | 36/153 |
| 4,446,634 | A * | 5/1984 | Johnson et al. | 36/29 |
| 4,688,283 | A | 8/1987 | Jacobson et al. | |
| 5,313,717 | A * | 5/1994 | Allen et al. | 36/28 |
| 5,416,986 | A * | 5/1995 | Cole et al. | 36/29 |
| 5,898,963 | A | 5/1999 | Larson | |
| 6,134,812 | A * | 10/2000 | Voss | 36/29 |
| 6,282,815 | B1 * | 9/2001 | Caston | 36/29 |
| 6,457,262 | B1 * | 10/2002 | Swigart | 36/29 |
| 6,530,092 | B2 | 3/2003 | Pope | |
| 6,553,691 | B2 * | 4/2003 | Huang | 36/29 |
| 7,244,483 | B2 * | 7/2007 | Tawney et al. | 428/35.7 |
| 7,735,241 | B2 | 6/2010 | Marvin et al. | |
| 2006/0112593 | A1 * | 6/2006 | Marvin et al. | 36/29 |

* cited by examiner

*Primary Examiner* — Elizabeth Houston
*Assistant Examiner* — Michael R Reid
(74) *Attorney, Agent, or Firm* — Barlow, Josephs & Holmes, Ltd.

(57) ABSTRACT

Cell flow technology is a platform technology comprised of a family cell, or multiple familiar cells (matrix), in a homogeneous or heterogeneous group format, which includes primary and secondary active cells and passive cells. These continuance cells in a congruent or varying size and shape that have the same or different degrees of capabilities are interconnected and interactive with or without the advantage of a properly calibrated and variable continuance valve(s) and shall dynamically transfers air, gas, liquid, or other substance or media, or mixture thereof by a continuously variable, and renewable, continuance of pressure resistance autogeneously through elastomeric potential energy, geometric advantages, introduction of a force, or removal of a source of a force. Thereby, the family cell will perform the predetermined function in a present device that shall use the technology for a wide array of uses for any imaginable living being that shall operate the technology.

6 Claims, 9 Drawing Sheets

CELL FLOW TECHNOLOGY THAT PROVIDES CONTINUOUSLY VARIABLE, AND RENEWABLE, CONTINUANCE OF PRESSURE RESISTANCE

CROSS REFERENCE TO RELATED APPLICATION

This application is related to and claims priority from an earlier filed Provisional Patent Application Ser. No. 61/489,858, filed May 25, 2011. The entire contents thereof are incorporated herein by reference.

BACKGROUND OF THE INVENTION

The invention relates generally to cushioning and padding constructions and the component cells used therein for use in a wide array of applications and devices such as therapeutic devices, cushions, safety equipment and body protective equipment. As part of providing a cushion or pad construction for these uses continuance cells are typically provided. They are filled with media, such as gas, air or a liquid, or other substrate, or combination thereof to provide the needed method for whatever devise that shall employ the technology.

Clearly, there is a demand and a need for a new and novel platform technology that can provide a continuously variable, and renewable, continuance of pressure resistance. This is far superior to the static devices of the prior art. Such a technology of the given invention has applications in many different fields, in many different utilities, devices and methods. Currently, this new and unique technology of the given invention is not applied.

There has been a number of attempts in the prior art to address the aforementioned needs. For instance, prior art U.S. Pat. No. 4,688,283, issued to Jacobson, et al on Aug. 25, 1987 teaches a "Mattress, Which Conforms To Body Profile." This is a prior art mattress that includes "embodiments that contain flexible airtight chambers at least two of which are interconnected to allow the transfer of air or liquid. Interconnected chambers are positioned and dimensioned to conform to and support the natural curves of a reclining body." This prior art air mattress is inflatable by one method a motor and only a release valve will decrease the total volume of static air pressure when operated by a consumer.

The interconnections of air chambers are not present for a continuously variable, and renewable, continuance of pressure resistance, but rather only for design to fill the air mattress with a static pressure resistance to conform to the different parts of some of the human anatomy. Certainly, in this prior art device there are no interactions between primary and secondary active or passive continuance of a heterogeneous or heterogeneous group family cells. In view of the limitations of the above mattress, there is a need for a more interactive pressure resistance device.

In prior art U.S. Pat. No. 5,898,963, issued to Lynn D. Larson on May 4, 1999 is illustrated a second example of prior art in, "Adjustable Support Cervical Pillow". In this patent there is a static pressure resistance. In this prior art reference airflow is not a continuously variable, and renewable, continuance of pressure resistance. Its method is only employed to fill the pillows one chamber with a fixed or static amount of air to adjust the height of the pillow to match the needs of the operator during sleep.

Therefore, motor-driven static air pressure is inserted into one bladder, in the "Adjustable Support Cervical Pillow", from a metal cylinder tank located at the top of the pillow. This is to fill the bladder with a static pressure resistance to correctly align the user's head and neck in only a side lying position. Air pressure can be removed or added by the operator by control of an air compressor motor attached to a metal air reservoir tank. This is only to provide an adjusted height to the device to match the dimensions in size of the operator while lying in a side position. There is no continuously variable, and renewable, continuance of pressure resistance, between primary or secondary active cells and passive cells, of a homogeneous or heterogeneous group family cell. This embodiment is merely an air-compressed tank and an air bladder and its method is much like the inflation and deflation of a helium balloon by an air compression tank and motor. These two previous patents do not provide the utility, device and method, which dynamically transfer media, air, gas, liquid or other substrate or mixture thereof, by a continuously variable, and renewable, continuance of pressure resistance. Therefore cell flow technology remains novel and unique.

Still further, U.S. Pat. No. 7,735,241, issued to Marvin, et al, on Jun. 15, 2010 provides for a "Shoe Having An Inflatable Bladder". This utility, device and method uses operator motion and or multiple pump embodiments to inflate multiple connected bladders in a running shoe with a static amount of air pressure.

It gives the consumer some similar utility such as support and comfort. However, it lacks the utility device and method of cell flow technology, which illustrates the need for such a technology. In the Marvin et al, the device "Shoe Having An Inflatable Bladder", as exampled, there is again not a dynamic transfer of media air, gas liquid, or other substrate or mixture thereof, by a continuously variable, and renewable, continuance of pressure resistance, between interlocking and interactive, congruent or differently shaped, same or differently capable primary and secondary passive cells and active cells of a homogeneous or heterogeneous family cell. It is only a series of strategically placed bladders interconnected by valves in order to uniformly fill said bladders with static air pressure. Although, there are several options to fill the multitude of bladders with a static air pressure, user motion, and several hand pump designs, the utility device and method is very different than that of the present invention.

The utility, device and method of Marvin, et al, fills the bladders with a constant, equal and even air pressure which the user may determine. Its utility, device and method does not to allow dynamic transfer of media, air, gas, liquid, or other substrate of mixture thereof, by a continuously variable, and renewable, continuance of pressure resistance between continuance cells of a family cell. Therefore, there is a need for a new interactive pressure resistance utility, device and method to provide such a function.

Still further, prior art U.S. Pat. No. 6,530,092; issued to Pope on Mar. 11, 2003 for a "Fitting And Comfort System With Inflatable Liner For Helmet" describes an "inflatable liner for a helmet. The liner has a first elongated cell and a second elongated cell extending substantially parallel to the first elongated cell. Passages extend through the first divider to permit air to pass between the first and second cells during an impact event. The second elongated cell is divided into separate sub cells and a single air inlet is provided for introducing air into the liner." In this embodiment, the utility, device and method is apparently to allow a predetermined amount of static air pressure to transfer from one chamber of equal size and pressure to another chamber of equal size and pressure upon an impact event above the tolerance of the predetermined pressure of the inflated bladders.

It appears to offer some attributes such as improved comfort, fit, and within this particular product it is a lighter material, thus more functional. There appears to be one or more valves to aid in the task of static air inflation and a pressure pump is provided to inflate the connected bladders together and equally fill them simultaneously. However, in reality since the two or more bladders have equal pressure and equal finite volume it is not conceived that this utility, device and method would allow for a transfer of air between the bladders. Rather this utility, device and method is only a static filled air bladder, divided into segments and sections. It is clear, it does not resemble a continuously variable, and renewable, continuance of pressure resistance such as the platform technology of cell flow technology.

It is an air cushion to replace other cushioning material of which certainly would be heavier in a helmet and thus less functional and desirable. There is no utility, device and method to transfer pressure resistance between primary and secondary passive cells and active cells, of a homogeneous or heterogeneous family cell. Further, any continuance of air in the utility, device and method of "Fitting And Comfort System With Inflatable Liner For Helmet" that may in fact appear after a proposed impact event seems to have the ability of only a cushion and not a shock absorber, due to an equal volume of static air pressure within the multiple bladder's within the helmet, or insert.

This utility, device, and method is separate, distinct and inferior to cell flow technology of the present invention, as are the previous aforementioned patents discussed above. All of the above mentioned patents lack the utility, device and method of the structure of cell flow technology and function of decreased pressure resistance volume capability of the active and passive cells, (unequal volume capacity), greater external pressure of the active cell, (an elastomeric advantage), the dynamic transfer of air, gas, liquid, or other substrate or media or mixture thereof by operator force motorized, mechanical, or computerized, or the ability to dynamically transfer media upon the release of the cause of the resistance, on an active or passive cell and last any combination of the above, that will perform the needed task of continuously variable, and renewable, continuance of pressure resistance, that shall have the attendant advantage, to cause interactivity between the continuance cells.

Certainly, it is conceived that such cell flow technology will be a unique and a distinctly new and improved utility, device and method for the aforementioned helmet liner or helmet and other above cited patents. It is clear these prior patents are distinctly different and apart from cell flow technology's, utility, device and method. Cell flow technology clearly remains special, unique and novel in comparison to the mentioned prior art.

In view of the foregoing cited patents, there is a need for a new and improved interactive platform technology with a new utility, device and method that can solve the aforementioned problems and failures associated with above discussed prior art devices.

SUMMARY OF THE INVENTION

There is a need for cell flow technology of the present invention, that shall dynamically transfer media, air, gas, liquid, or other substrate or mixture thereof by a continuously variable, and renewable, continuance of pressure resistance, between two or multiple continuance cells, to perform a desired function, in the present device, that shall use the technology, for any imaginable living being, that shall operate the technology.

There is a need for a platform technology that has the attendant advantages with the utility, device and method of this given technology and invention. This technology will improve many current inferior utilities, devices and methods, of the present invention and it will allow the creation of many new utilities, devices and methods which are unattainable without its unique, new and novel properties. The present invention and technology will also preserve the advantages of prior art, and invention and it will provide new advantages not found currently in the available art, and invention. Last, it will overcome many disadvantages of such currently available art, and invention available today.

Cell flow technology may be generally separated in two sections for elaboration. The structure of this present invention wherein; a family cell that shall dynamically transfer media, air, gas, liquid, or other substrate or mixture thereof, endogenously by its novel invention. This technology produces a continuously variable, and renewable, continuance of pressure resistance, between two or multiple primary and secondary active and passive continuance cells of a homogeneous group family cell; same type combination, (active-active, passive-passive) or heterogeneous group family cell; different type combination (passive-active, active-passive) to perform a desired function, in the present device, that shall use the technology, for any imaginable living being, that shall operate the technology.

Cell flow technology's function whereby; its family cell shall with the use of an operator force, motorized, mechanical, computerized or other form of pressure resistance of the primary passive cells or primary continuance cell of its homogeneous or heterogeneous group family cells, and decreased pressure volume capability (unequal pressure volume capacity), of the primary passive cells or primary continuance cell of its homogeneous or heterogeneous group family cells, and greater external pressure (an elastomeric advantage) of the primary active cells or primary continuance cell of its homogeneous group family cells, and upon the release of the cause of the pressure resistance of the secondary active cell or secondary continuance cell of its homogeneous or heterogeneous group family cell, and any combination of the above of the primary passive cells or primary continuance cell of its homogeneous or heterogeneous group family cells; shall dynamically transfer media, air, gas, liquid, or other substrate or mixture thereof, from one or multiple interactive and interlocking primary passive cells, or primary continuance cell of its homogeneous or heterogeneous group family cells, to one or multiple interactive and interlocking familiar secondary active cells, or secondary continuance cell of its homogeneous or heterogeneous group family cells, with or without the advantage of a properly calibrated and variable continuance valve, or multiple properly calibrated and variable continuance valves to achieve the desired function of the device in which this technology shall be applied for any imaginable living being that shall operate the technology.

Upon the release of the cause of the pressure resistance the secondary active cell or secondary continuance cell of its homogeneous or heterogeneous group family cell will with or without the advantage of the properly calibrated and variable continuance valve, or multiple properly calibrated and variable continuance valves dynamically transfer air, gas liquid, or other substrate or mixture thereof, by a continuously variable, and renewable, continuance of pressure resistance, to its familiar interlocking and interactive primary passive cells or primary continuance cell of it's homogeneous or heterogeneous group family cells, by method of, but not limited to; an operator force, motorized, mechanical, computerized or other form of pressure resistance, of the secondary active cells or secondary continuance cell of its homogeneous or heterogeneous group family cells, and decreased pressure volume capability (unequal pressure volume capacity) of the secondary active cells, or secondary continuance cell of its homogeneous or heterogeneous group family cells, and greater external pressure (an elastomeric advantage) of the secondary active cells, secondary continuance cell of its homogeneous group family cells, of and upon the release of the cause of the pressure resistance of the primary passive cell or primary continuance cell of its homogeneous or heterogeneous group family cells and any combination of the above of the secondary active cells or continuance cell of its secondary homogeneous or heterogeneous group family cells, that shall perform the desired task, by creating a continuously variable, and renewable, continuance of pressure resistance, autogeneously in the present utility, device and method, that shall use the technology, for any imaginable living being, that shall operate the technology.

Cell flow technology of the present invention is needed and in great demand. It is noted that cell flow technology may be used in such products but not limited to as follows: sports gear and equipment such as helmets including but not limited to other sports clothing such as shoes and other footgear, gloves, and body protective pads. Clothing such as shoe inserts, sandals, and any foot clothing, protective pants, shirts and outerwear.

Furthermore, cell flow technology utility, device and method may be used in support products that are common in our environment today such as but not limited to: Beds, mattresses, mattress covers, chairs and seated and recumbent furniture, pillows, and other sleep products, seated support materials, such as cushions, motorized vehicle seats, aircraft seats and motor vehicle safety bumpers.

It is further conceived that such cell flow technology utility, device and method will be needed in addition but not limited to health care equipment; Such as joint therapy and orthopedic joint implantation devices and products and other health and medical implantation devices and artifacts and cervical and thoracic spine supports, lumbar spine and pelvic supports, other body supports and braces, air-casts and other body casts, hospital bedding and other hospital devices that affix, adhere to, or contact any part of the body, of any being, that shall operate the technology.

Cell flow technology utility, device and method will greatly impact our daily living, improve comfort, support our anatomy, improve our physiology, improve safety, and aid in the betterment of health care for our population. As stated above this unique bionics cell flow technology is able to reach a wide audience of products in our environment. Making these products safer, improving their function and further to aid in the unique development of new and better utilities, devices and methods.

Cell flow technology of the present invention by its continuously variable, and renewable, continuance of pressure resistance, will allow for a compressive isotonic exercise in health and fitness products, improved user comfort in pillows and cushioning products, and improve operator safety in protective type products such as helmets. An example, of such device is envisioned in commonly owned in Ser. No. 13/161,119, filed on Jun. 15, 2011 for "The Body Therapy Device." No current utility, device or method is similar to cell flow technologies attendant advantages as characterized in this art and invention.

It is a fact that cell flow technology somewhat mimics the magnificent physiology of human and other organic function. As individual cells in the human body uniquely perform their individual functions so do the individual family cells in a heterogeneous group or homogeneous group format in cell flow technology of the present invention. Further, as groups of individual cells in the human body, together inter-relate, and interact to perform functions such as lung tissue does for inspiration and expiration so does the heterogeneous group and homogeneous group formatted family cell(s) and groups of family cells, in a matrix of this unique cell flow technology.

Its capabilities are as wide reaching as its uses. Some of its capabilities are but not limited to decreasing ischemic pressure patterns, and nociceptor irritation, in a multitude of tissues in any operator that will use the technology to alleviate pain and discomfort. Furthermore, this will causally increase energy, improve comfort and improve endurance in the operator. Cell flow technology will improve sleep quality, (may decrease symptoms from sleep apnea and hypopnea), and so increase quality of life. Cell flow technology may be used for instance, in shoe inserts or shoe sole and other clothing products to improve comfort, support and performance. Cell flow technology may cushion the weight of protective goggles and underwater diving masks on the nasal bone, ear, and covering epidermis and act as a contour to allow the device to adhere properly without movement on the head and face.

Also, cell flow technology may be used to support and secure a hand in a glove, such as a baseball mitt or a foot into a hockey skate and soccer shoe or football cleat. This unique platform technology of the present invention would allow for a customized fit and comfort reducing motion, ischemic pressure patterns, and poor fit.

Cell flow technology may greatly decrease stress and strain from heel strike in stride, stabilize and comfort mid stance and reduce strain on toe off when used in the sole of the shoe. Further, making an operator less susceptible to common injuries associated with exercise, daily and work activities and improves lifetime endurance and health, most particularly in all the weight bearing joints of the body. A further example of a use for cell flow technology is to improve fit and aid in comfort in sporting and other type helmets.

It may limit motion and secure the head with a customized, variable and adjustable superior and unique fit, and further help to prevent head injuries not limited to concussions in comparison to other technology presently available. It is also envisioned that cell flow technology may be used in such a helmet where ischemic pressure and nociceptor irritation would collect and apply mechanical and chemical irritation, thus stimulating pressure and pain receptors in the body of the operator which causes discomfort, restlessness, and pain.

Further thought of uses in demand today may be in the health and medical fields. Cell flow technology, may be very efficient in rehabilitation equipment. It will allow for synergistic isotonic, and isokinetic therapy and treatment. The attendant advantages of the technology may further aid in the rehabilitation for postural correction, muscle or joint dysfunction, deconditioning, degeneration or a traumatic injury.

A last example to share of how cell flow technology may improve our lives and create a safer environment is in automotive vehicle roadside safety products such as roadway transition abutment safety barriers. Cell flow technology may be used to slow a motor vehicles velocity less abruptly upon impact and decrease vehicle damage and occupant trauma, by absorption of the energy created in the impact.

This platform technology of the present invention may reduce the velocity of the vehicle slower than traditional abutment barrier's presently in place. Thus, it may absorb energy and lessen vehicle mass deformation lessening the damages of motor vehicles and lessening the injuries of motor vehicle occupants in a motor vehicle traffic accident. Multiple family cells that may further contain computerized, and motorized continuance valves, which are properly and variably calibrated may accomplish this individually and collectively as a team. The multitude of continuance cells would slow the vehicle's velocity slower than current traditional roadway transition abutment safety barriers which currently more abruptly stop the motor vehicle causing great damage and injury.

BRIEF DESCRIPTION OF THE DRAWINGS

The novel features are characterized in this present technology are set forth in the appended claims. However, some of the invention's preferred and envisioned embodiments together with the technologies attendant advantages may be further understood by reference to the following brief descriptions taken in connection with accompanying drawings of some utilities, devices and methods that this technology will be used but not limited to, in which:

DETAILED DESCRIPTION OF THE PREFERRED EMBODIMENTS

Figure 1:
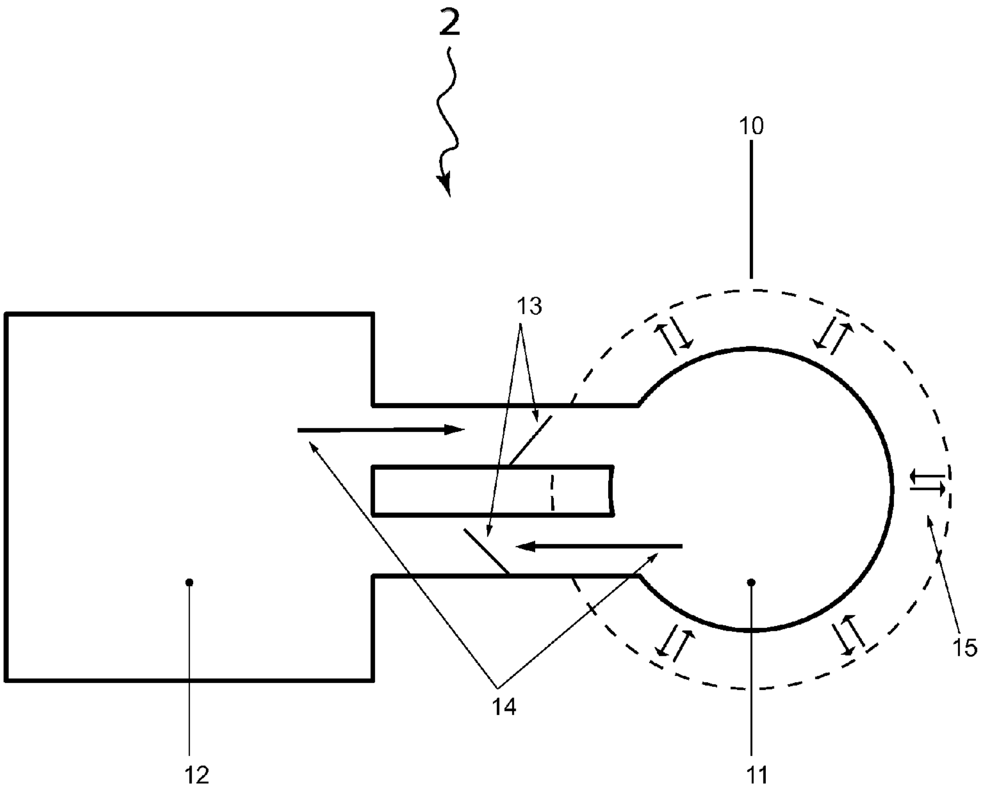
FIG. 1 illustrates a heterogeneous group family cell with a primary passive cell and a secondary active cell, with an elastomeric advantage.

In accordance with the present invention a heterogeneous group family cell 2, is illustrated in FIG. 1. Referring to FIG. 1, the heterogeneous group family cell 2, is depicted in the format of an unequal size or decreased volume capability 10 and a non-congruent shaped secondary active cell 11, as compared to its larger familiar primary passive cell 12. The secondary active cell 11, and the primary passive cell 12, of this heterogeneous group family cell of FIG. 1 is connected by two properly and variable calibrated continuance valves 13. The heterogeneous group family cell 2, in this embodiment with the use of an operator force, motorized, mechanical, computerized or other form of pressure resistance, shall dynamically transfer, media, air, gas liquid, or other substrate or mixture thereof endogenously, with the advantage of its properly calibrated and variable continuance valve 13, by a continuously variable, and renewable, continuance of pressure resistance 14, from the interactive and interlocking primary passive cell 12, to its familiar interactive and interlocking secondary active cell 11.

Further, in this illustration, FIG. 1, the heterogeneous group family cell 2, dynamically transfers media, air, gas, liquid, or other substrate or mixture thereof, with the advantage of the properly calibrated and variable continuance valve 13, by a continuously variable, and renewable, continuance of pressure resistance 14, from the secondary active cell 11, to its familiar interlocking and interactive primary passive cell 12, by method of decreased pressure volume capability or unequal volume capacity 10, of the secondary active cell 11, and greater external pressure, or an elastomeric advantage 15, of the active cell 11.

Figure 2:
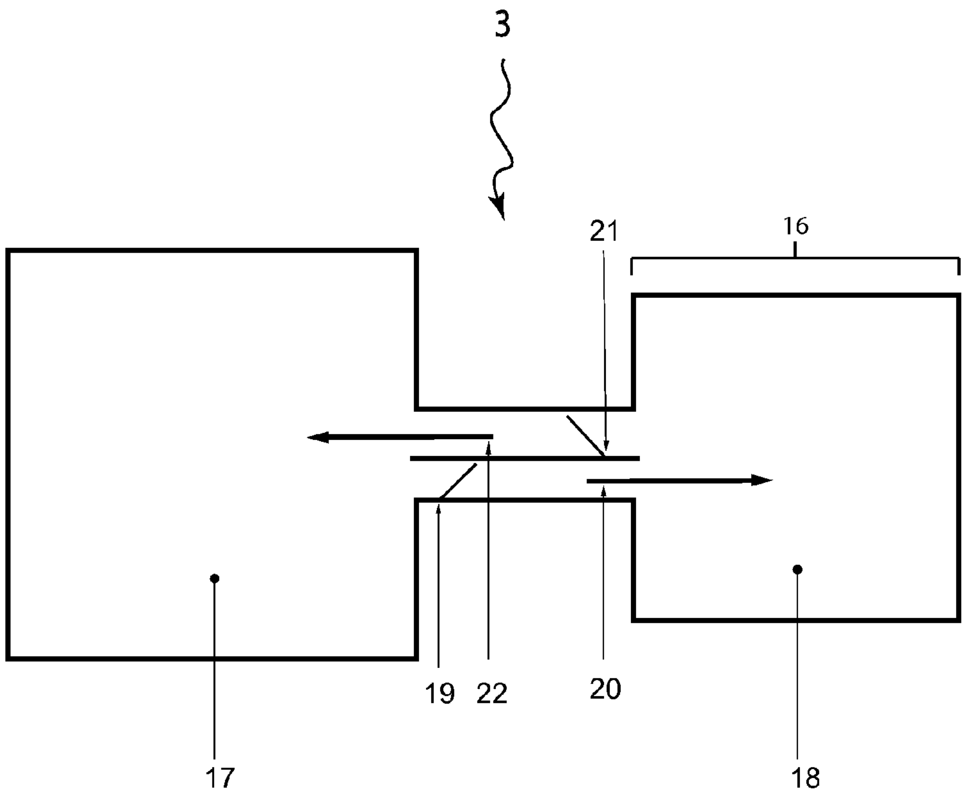
FIG. 2 illustrates a homogeneous group family cell with a primary passive cell and secondary passive cell with an unequal volume capability.

Referring to FIG. 2, is illustrated a homogeneous group family cell 3. The homogeneous group family cell 3 in FIG. 2, is shown with the format of an unequal size or decreased volume capability 16, and its two passive cells 17 and 18 are illustrated in a congruent shape and varying size configuration. The secondary passive cell 18 is smaller than the primary passive cell 17. The secondary passive cell 18 has a decreased volume capacity due to its unequal size. The disadvantage is an inherent characteristic of the continuance cell and is present in all postural phases (full, empty, filing filling and emptying). Shown in FIG. 2, is a primary passive cell 17, and a secondary passive cell 18 of a homogeneous group family cell. A properly calibrated and variable continuance valve 19, connects the two homogeneous group passive cells, 17 and 18, of this same type or homogeneous group family cell of FIG. 2. The homogeneous group family cell 3, in this embodiment of FIG. 2, shall with the use of an operator force, motorized, mechanical, computerized or other form of pressure resistance dynamically transfer media, air, gas liquid, or other substrate or mixture thereof, autogeneously and self contained with the advantage of a properly calibrated and variable continuance valve 19, by a continuously variable, and renewable, continuance of pressure resistance 20, from the interactive and interlocking primary passive cell 17, to its familiar interactive and interlocking secondary passive cell 18.

The secondary passive cell 18, with the advantage of its properly calibrated and variable continuance valve 21, shall with the use of an unequal size or decreased volume capacity, and an operator, motor, or any form of pressure resistance, or upon the release of the cause of the pressure resistance of the primary cell 17, shall dynamically transfer media, air, gas liquid, or other substrate or mixture thereof, by a continuously variable, and renewable, continuance of pressure resistance 22, from the secondary passive cell 18, to its familiar interlocking and interactive primary passive cell 17.

Figure 3:
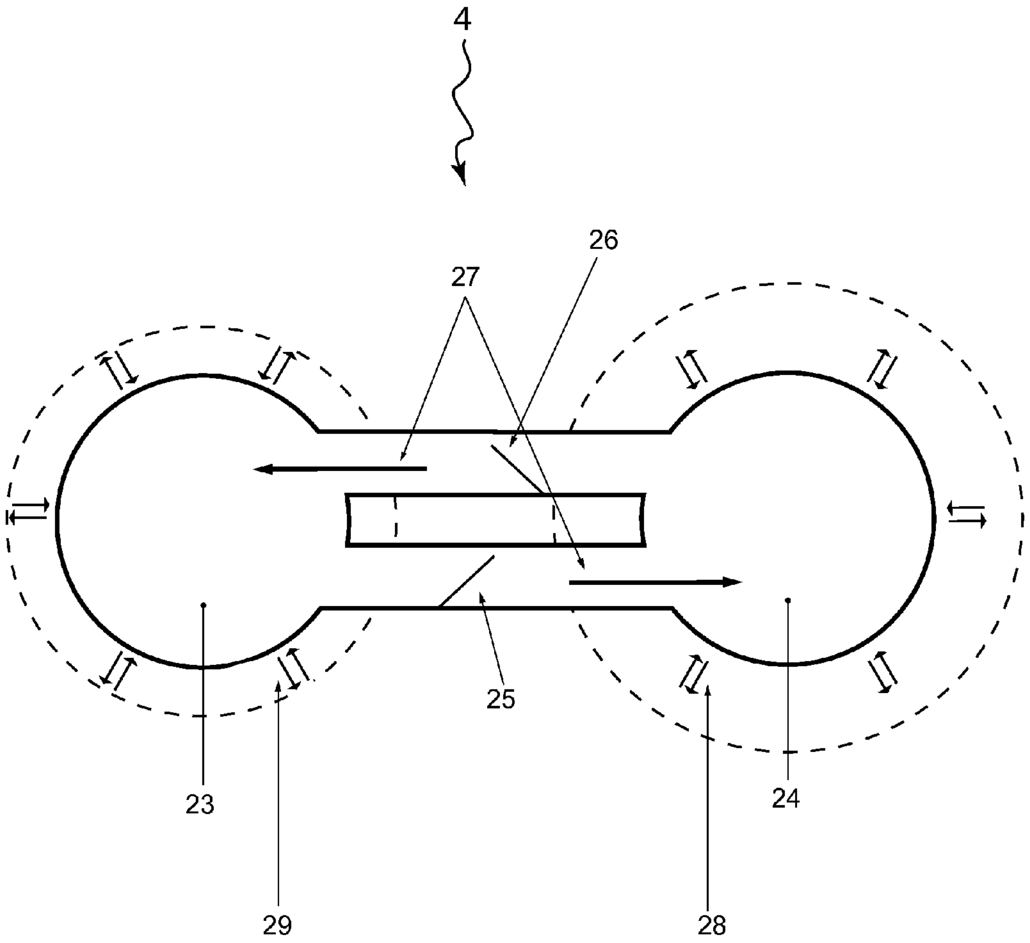
FIG. 3 illustrates a homogeneous group family cell with a primary active cell and secondary active cell, both with varying degrees of elastomeric capabilities.

Referring to FIG. 3, is illustrated a homogeneous group family cell 4. The homogeneous group family cell 4, is depicted in the format of a primary active cell 23, and secondary active cell 24. The primary active cell 23, and the secondary active cell 24, are connected by two properly calibrated and variable continuance valves 25, and 26. The active homogeneous group family cell 4, with the advantage of its properly calibrated and variable continuance valve 25, shall with the use of an operator force, motorized, mechanical, computerized or other form of pressure resistance and by greater external pressure or an elastomeric advantage dynamically transfer media, air, gas, liquid, or other substrate or mixture thereof, by a continuously variable, and renewable, continuance of pressure resistance 27, from the interactive and interlocking primary active cell 23, to its familiar interactive and interlocking secondary active cell 24.

Further, the homogeneous group family cell 4, with the advantage of its properly calibrated and variable continuance valve 26, shall dynamically transfer media, air, gas, liquid, or other substrate or mixture thereof, by a continuously variable, and renewable, continuance of pressure resistance 27, from the secondary group homogeneous active cell 24, and return it to its familiar interlocking and interactive primary active cell 23, by method of greater external pressure or a greater elastomeric advantage 28, of the secondary active cell 24, more than the greater external pressure or elastomeric advantage 29, of the primary active cell 23.

Figure 4:
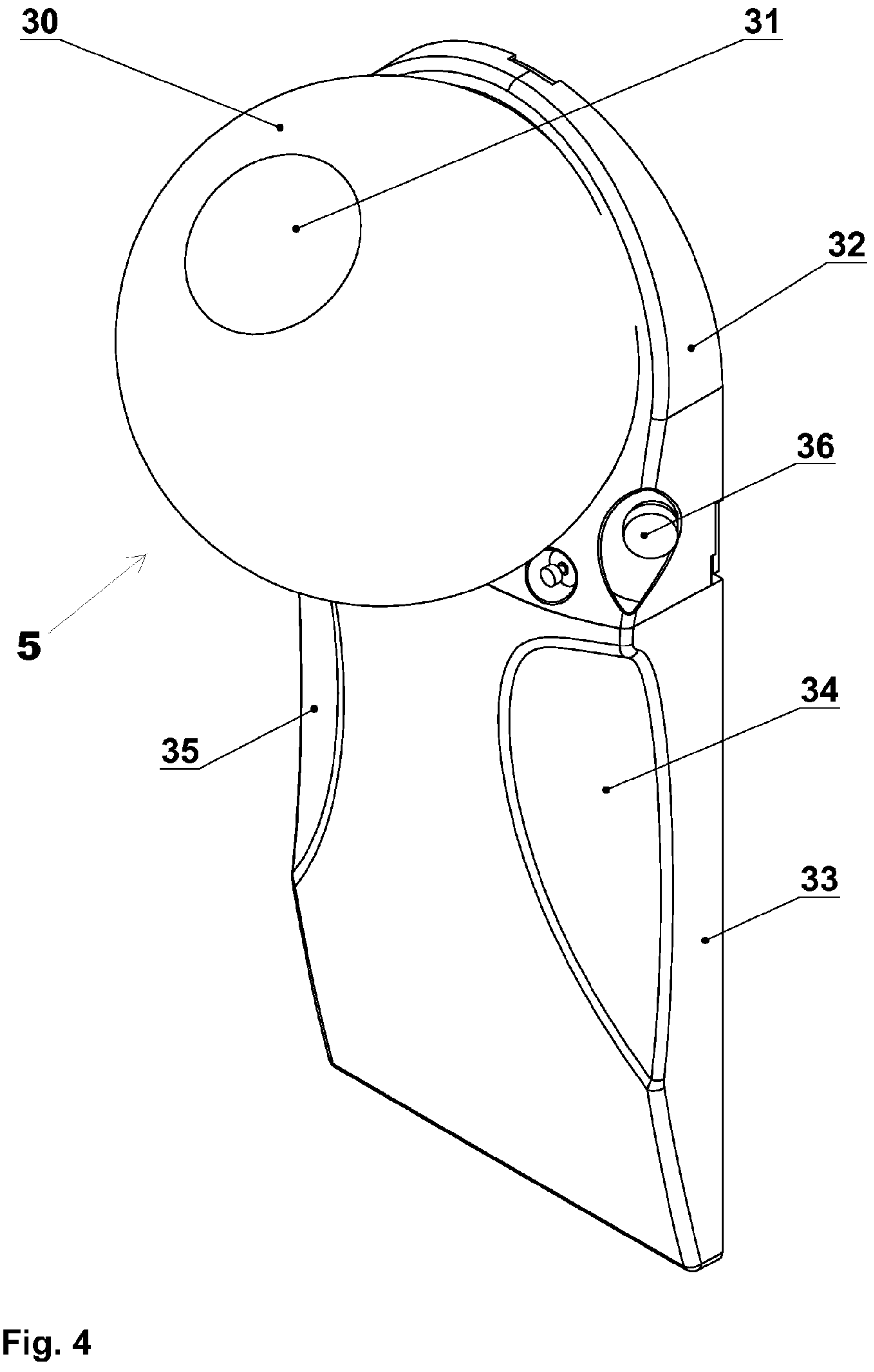
FIG. 4 is a perspective front view of a sample application of the cell flow technology as used in The Body Therapy Device as found in Ser. No. 13/161,119, filed on Jun. 15, 2011.

Referring to FIG. 4, is a perspective front angled view of The Body Therapy Device, Non Provisional Utility patent application Ser. No. 13/161,119, filed on Jun. 15, 2011 and is related to and claims priority from earlier filed Provisional Patent Application Ser. No. 61/355,375, filed Jun. 16, 2010. This utility, device and method uses cell flow technology, to complete its designed function. The therapy device 5 includes a foam outer ball shaped shell 30, which is comprised of a primary passive cell within (not shown). Angled at 45 degrees from the floor is an occipital concavity 31, which allows an operator to firmly and securely contact the foam outer shell of the ball portion of the body therapy device, in order to compress the primary passive cell by operator force, motorized, mechanical, computerized or other form of pressure resistance during intended use and inflate the secondary active cell (not shown), that in the body therapy device has an non-congruent shape, elastomeric advantage, and a decreased volume capability for efficient performance. The secondary active cell is located in the rear hard plastic portion of the device 32.

Positioned therebelow is a removable thoracic pad 33, which allows the operator to be properly positioned while operating the device. On bilateral sides of the thoracic pad are concavities 34, and 35, to allow for comfortable and efficient positioning of the shoulders and arms during use of the embodiment. A pressure pump is shown 36, to alter the amount of "beginning pressure resistance" of the primary passive cell to allow for different degrees of difficulty for the different abilities of the operators. Further, not illustrated is a properly calibrated and variable continuance valve located between and connecting the primary passive and secondary active cells (not illustrated). This properly calibrated and variable continuance valve also will assist to deliver different degrees of difficulty for the different abilities of the operators while the device is in use.

Figure 5A:
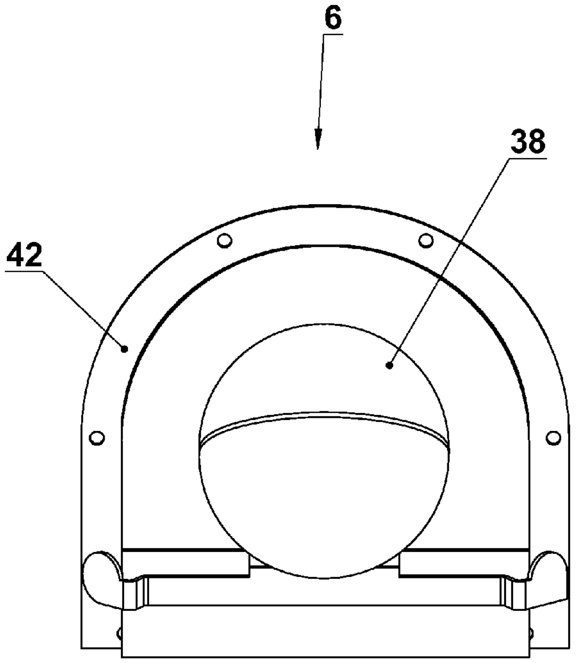
FIG. 5A illustrates a front view of the primary passive cell of a heterogeneous group family cell, inside the body therapy device of FIG. 4.
Figure 5B:
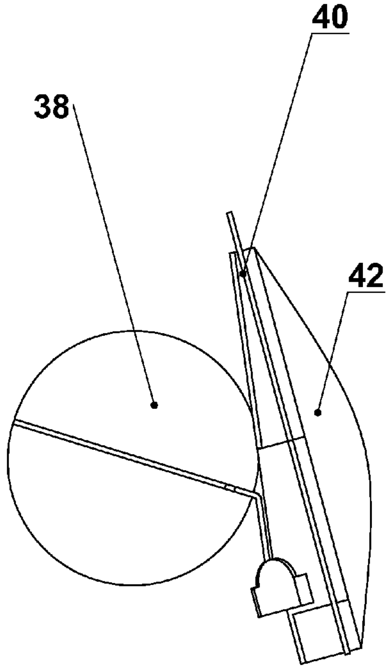
FIG. 5B is a perspective side view of the heterogeneous group family cell of the body therapy device of FIG. 4, that is comprised of a primary passive cell and secondary active cell.
Figure 5C:
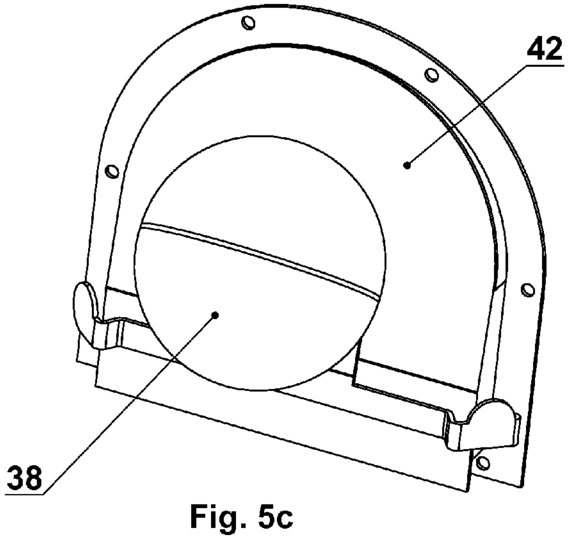
FIG. 5C illustrates a perspective view of the passive cell of a heterogeneous group family cell inside the device of FIG. 4.

Referring to FIGS. 5A, 5B, and 5C, illustrate an application and use of a heterogeneous group family cell 2, in the form of the body therapy device 6. The primary passive cell 38, is depicted in FIG. 5B, from a side position, inflated, and further shown in FIGS. 5A, 38, and 5C, 38. In FIG. 5B, is a side illustration of the hard plastic wedge portion 40, of the body therapy device 6. Further, the secondary active cell of the body therapy device 6, is shown from the front in FIGS. 5C, 42, and 5A, 42, and in FIG. 5B the active cell 42, from the side in an exaggerated inflated fashion for viewing purposes. It can be noted that the secondary active cell in the device 6, has the advantage of decreased volume capability and greater elastomeric capability.

Figure 6A:
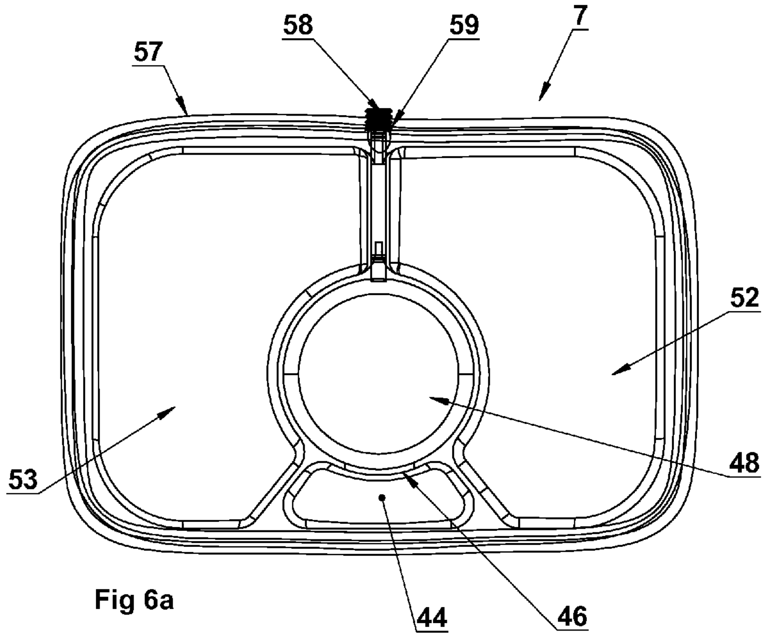
FIG. 6A shows a top view of a further application and use of the present invention in the form of a Cellular Flow Cervical Pillow, which is disclosed in Provisional Patent Application Ser. No. 61/499,979, filed on Jun. 22, 2011.
Figure 6C:
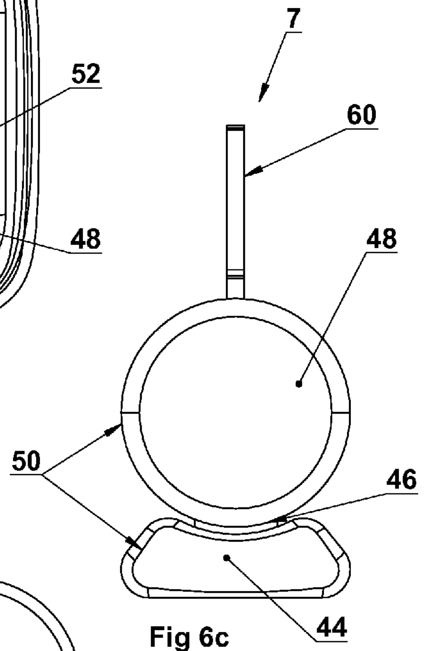
FIG. 6C illustrates a family cell within the cellular flow cervical pillow comprised of a primary passive cell and a secondary active cell, creating a heterogeneous group family cell.
Figure 6B:
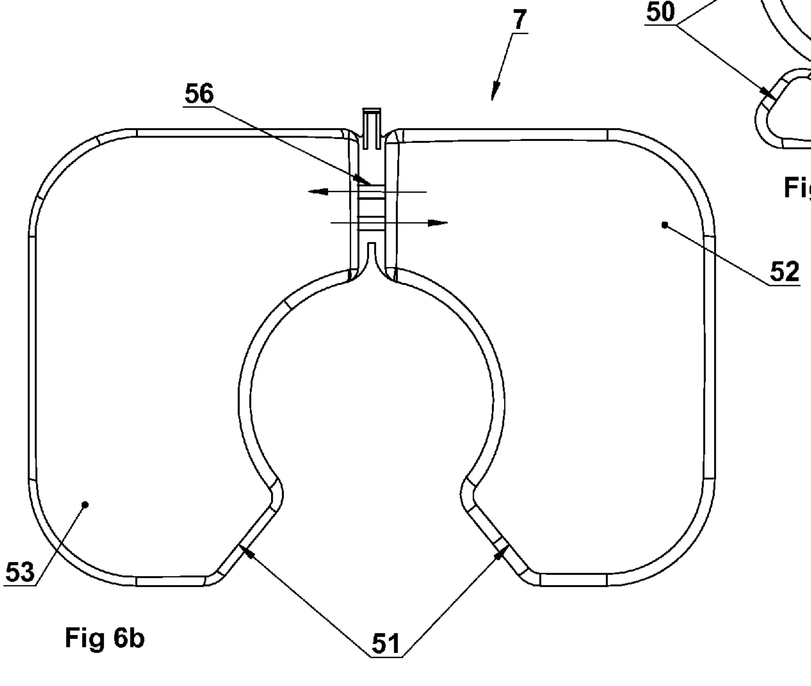
FIG. 6B is a further top view of a family cell showing two passive cells, (primary passive cell and secondary passive cell). Completing a homogeneous group family cell, within the cellular flow cervical pillow.

In further accordance of the current utility, device and method of the present invention, FIGS. 6A, 6B, and 6C illustrate a further application of the present invention. These figures show the perspective front or top view of Cellular Flow Cervical Pillow 7, Provisional Patent Application Ser. No. 61/499,979, filed on Jun. 22, 2011. This is a further example of a device that employs cell flow technology of the present invention. In reference 44 in FIG. 6A, and reference 44, in 6C, are secondary active cells that shall dynamically transfer media, air, gas, liquid, or other substrate of mixture thereof, by a continuously variable, and renewable continuance of pressure resistance with or without the advantage of a properly calibrated and variable continuance valve 46, shown in FIG. 6A, and 46, in FIG. 6C, by an operator force, motorized, mechanical, computerized or other form of pressure resistance on the primary passive cell 48, in FIG. 6A, and 48, in FIG. 6C. Thus completing a heterogeneous group family cell 50, shown best in FIG. 6C, in the form of a cellular flow cervical pillow 7.

Further depicted in FIG. 6B, is a homogeneous group family cell 51, comprised of two passive cells 52, and 53. These continuance cells 52, and 53 are further illustrated in FIG. 6A, as 52 and 53, respectively. These continuance cells dynamically transfer media, air, gas, liquid, or other substrate of mixture thereof, by a continuously variable, and renewable continuance of pressure resistance with the use of properly calibrated and variable continuance valves 56, also illustrated in FIG. 6B. The cellular flow cervical pillow that is surrounded by a foam outer shell 57, shown in FIG. 6A uses initial or "beginning pressure resistance" for user comfort and support that is initiated by a pressure pump 58, illustrated in FIG. 6A, and pressure release valve 59, also illustrated in FIG. 6A, if the cellular flow cervical pillow is not pre-filled with a beginning pressure resistance prior to purchase. In FIG. 6A, is a pressure release valve 59, that may be used by the operator to alter the beginning pressure in the primary passive cells 48, shown in FIG. 6A, or may be used to completely deflate the primary passive cell 48, by the operator's choice. Finally, in FIG. 6C, a pressure increase and decrease inlet 60, is provided so an operator may increase or decrease the beginning pressure resistance into the primary passive cell 48, shown in FIG. 6A, and additionally illustrated primary passive cell 48, in FIG. 6C in the cellular flow cervical pillow.

Figure 7A:
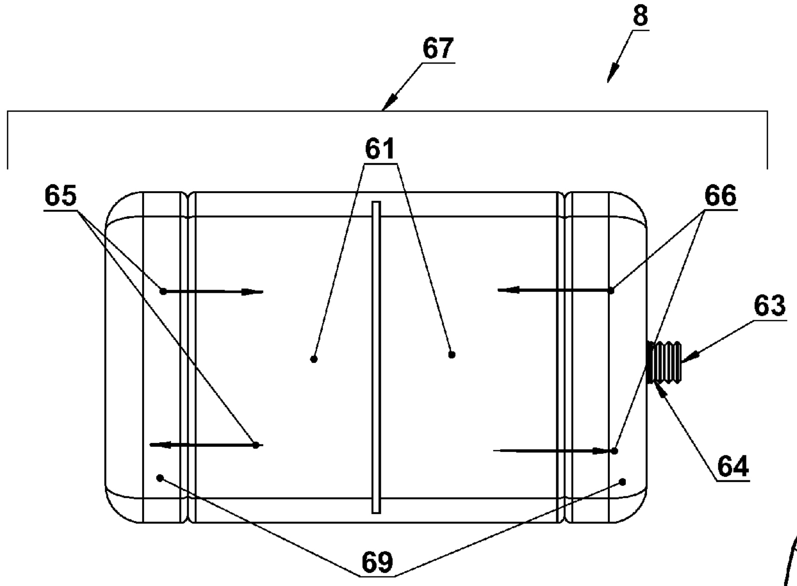
FIG. 7A illustrates a front view of another embodiment of the present invention, of the Cellular Flow Lumbar Support Pillow, Provisional Patent Application No. 61/489,858, filed on Jun. 22, 2011.
Figure 7B:
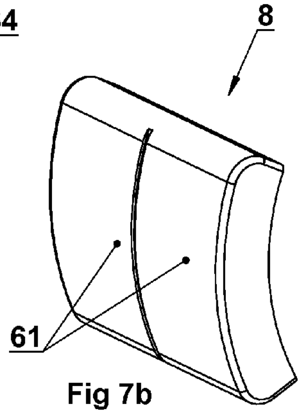
FIG. 7B is a perspective view of two non-related primary passive cells, belonging to the cellular flow lumbar support pillow.
Figure 7C:
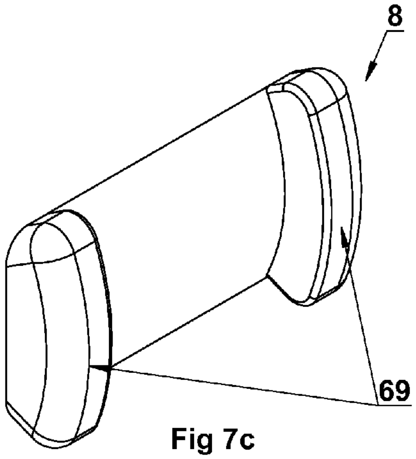
FIG. 7C illustrates two non-related secondary active cells, within the cellular flow lumbar support pillow.
Figure 7D:
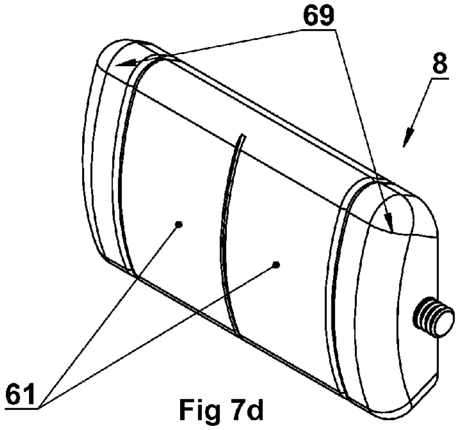
FIG. 7D depicts a front perspective view, of the cellular flow lumbar support pillow's multiple heterogeneous group family cells.

FIGS. 7A, 7B, 7C, and 7D illustrate yet another application of the construction system and method of the present invention. In FIGS. 7A-7D, a Cellular Flow Lumbar Support Pillow 8 is shown, which is also disclosed in U.S. Provisional Patent Application No. 61/489,858, filed on Jun. 22, 2011. The above-mentioned cellular flow lumbar support pillow 8, is yet another example of cell flow technology in a utility, device and method. FIGS. 7A, 7B and 7D is a top view of the cellular flow lumbar support pillow 8, that shows two unrelated primary passive cells 61, that each belong to separate heterogeneous group family cells with their familiar secondary active cells 69, also shown in FIGS. 7A, 7C and 7D. They may interact by multiple continuance valves (not shown) inside the cellular flow lumbar support pillow 8.

Further, in FIG. 7A, is depicted a pressure pump 63, and a pressure release valve 64. These allow an operator to initially fill the primary passive cells with a desired beginning pressure if such an embodiment is not pre-filled upon consumption of which shall then dynamically transfer media, air, gas, liquid, or other substrate or mixture thereof (not illustrated) by a continuously variable, and renewable, continuance of pressure resistance 65, and 66, self contained within the primary passive cells 61, and secondary active cells 69, illustrated in 7A, independently within the two heterogeneous group family cell units of this heterogeneous group matrix cell 67, of the cellular flow lumbar support pillow 8.

FIG. 7B shows two unrelated passive cells 61, separated from the cellular flow lumbar support pillow 8. FIG. 7C, illustrates the two secondary active cells 69, also separated from the cellular flow lumbar support pillow. No properly calibrated and variable continuance valves are shown in FIGS. 7A-7D, although these continuance valves may be present. FIG. 7D, depicts the cellular flow lumbar support pillow 8 from a side view with the family cells in tacked intact comprising of two secondary active cells 69, with two primary passive cells 61, therefore including multiple heterogeneous group family cells of a heterogeneous group matrix.

Figure 8B:
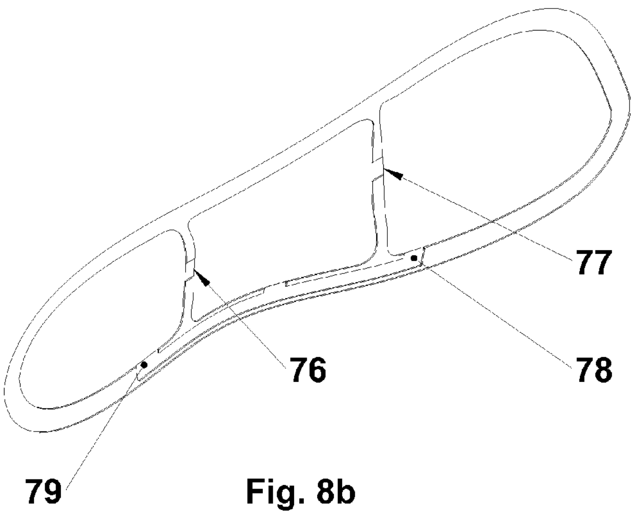
FIG. 8B shows a perspective bottom view of the shoe pad illustrating multiple continuance valves.
Figure 8A:
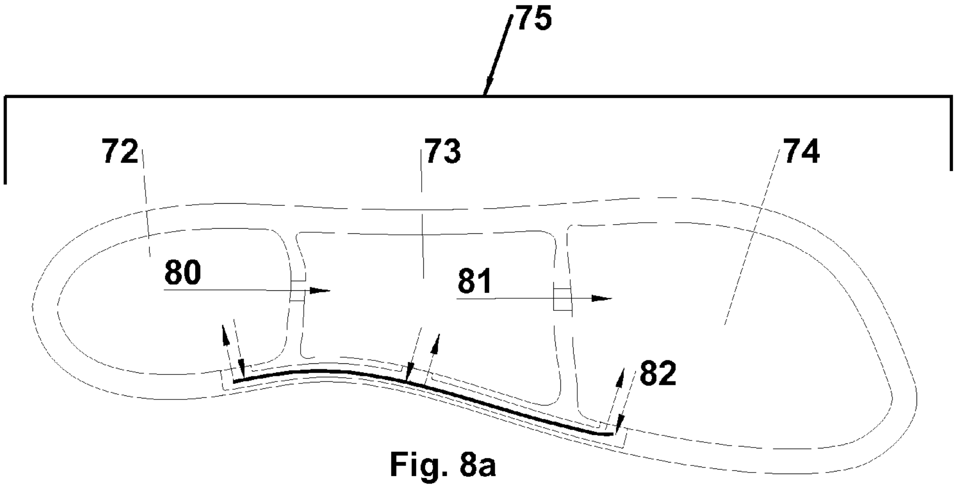
FIG. 8A illustrates a top view of a shoe pad with a homogeneous group family cell of the present invention comprised of a three passive cells, one primary and two secondary passive cells.
Figure 8C:
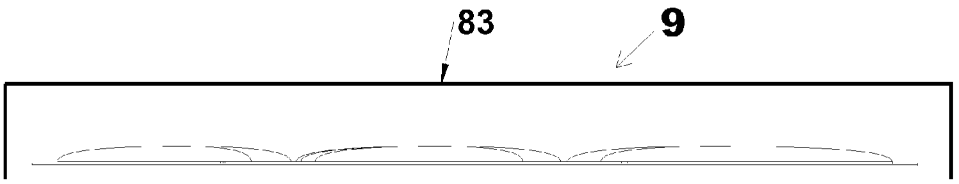
FIG. 8C shows an elevated side view of the shoe pad of the present invention.

In FIGS. 8A, 8B, and 8C, is shown a sole insert 9 embodiment, which employs cell flow technology of the present invention. FIG. 8A, shows 3 passive cells 72, 73, and 74, comprising a homogeneous group family cell 75. These passive cells 72, 73, and 74, are connected by properly calibrated and variable continuance valves 76, 77, 78, and 79, shown in FIG. 8B. A continuously variable, and renewable, continuance of pressure resistances is illustrated in FIG. 8A, 80, 81, and 82. Not illustrated are a pressure pumps and release valves of which would initially inflate and deflate the device with a beginning pressure resistance to operator specifications, if such a device was not pre-inflated with an initial or beginning pressure resistance prior to purchase. After a desired amount of pressure resistance is inserted into the sole insert device 9, the continuously variable, and renewable, continuance of pressure resistance, 80, 81 and 82, as illustrated in FIG. 8A, through the properly calibrated and variable continuance valves, 76, 77, 78 and 79, will aid in the dynamic transfer of media, air, gas, liquid, or other substrate or mixture thereof (not illustrated) as the operators gait changes from heel strike to mid stance and then to toe off. The continuously variable, and renewable, continuance of pressure resistance will dynamically transfer media, air, gas liquid, or other substrate or mixture thereof autogeneously (not illustrated), by an operator force, motorized, mechanical, computerized or other form of pressure resistance and will match the movement of the operator in a walking gait, jog, or run. Moving from the heel of the foot to the toes, of the foot and back again to the heel of the foot. Further, FIG. 8C shows a side view of the sole insert as a homogeneous group family cell 83.

Figure 9A:
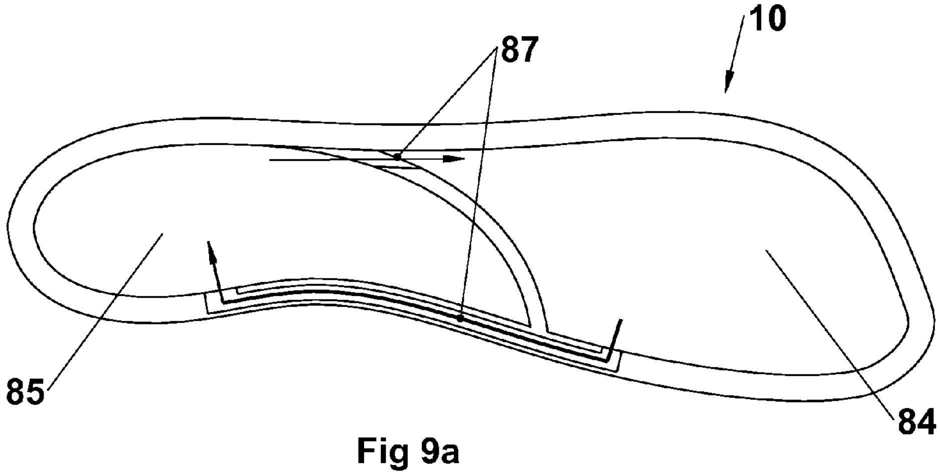
FIG. 9A illustrates a top view of a heterogeneous group family cell of the present invention in a shoe insert comprised of a primary passive cell and secondary active cell.
Figure 9B:
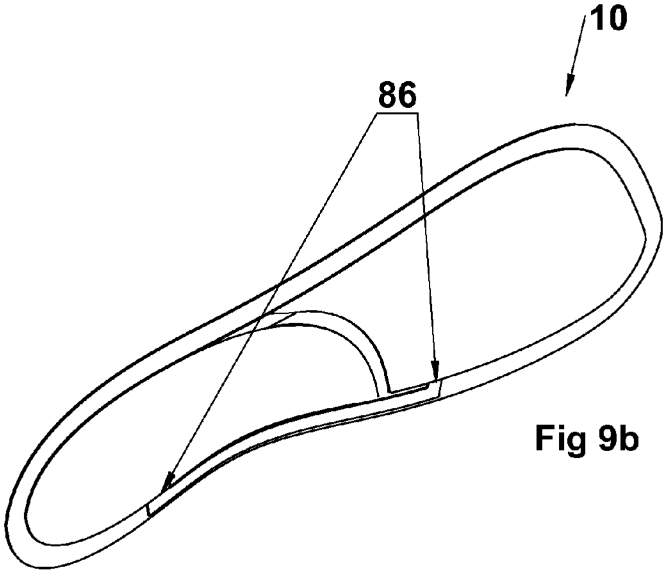
FIG. 9B illustrates a bottom view of a heterogeneous group family cell, in a shoe insert comprised of a secondary active cell and a primary passive cell.
Figure 9C:
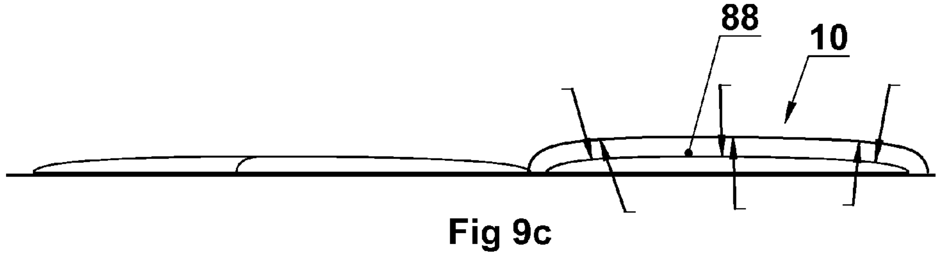
FIG. 9C illustrates a side view of a heterogeneous group family cell, in a shoe insert comprised of a secondary active cell and a primary passive cell from a side view.

Illustrated in FIGS. 9A, 9B, and 9C, are other examples of a modified sole insert 10. A utility, device and method that employs cell flow technology of the present invention. In FIG. 9A, is a heterogeneous group family cell comprised of a secondary active cell 84, and a primary passive cell 85. The secondary active cell 84, in FIG. 9A, shall interact with its familiar primary passive cell 85, though a properly calibrated and variable continuance valves 86, shown in both FIGS. 9A, and 9B. The properly and variably calibrated continuance valves 86, will assist in the dynamic transfer of media, air, gas, liquid, or other substrate or mixture thereof, by a continuously variable, and renewable, continuance of pressure resistance 87, and interact between the primary passive cell 85, and the secondary active cell 84, by and operator force, motorized, mechanical, computerized or other form of pressure resistance. The continuously variable, and renewable, continuance of pressure resistance 87 dynamically transfer media, air, gas, liquid, or other substrate or mixture thereof endogenously (not illustrated), as the operators gait passes from heel strike to mid stance to toe off. Further, the secondary active cell 84, by elastomeric advantage 88, illustrated in FIG. 9C, and a combination of an operator force, motorized, mechanical, computerized or other form of pressure resistance will dynamically transfer media, air, gas, liquid or other substrate or mixture thereof by a continuously variable, and renewable, continuance of pressure resistance interactively back to the primary passive cell 85, thereby autogeneously renewing media, air, gas liquid, or other substrate or mixture thereof for a future interaction.

It should be noted that the cell flow technology and the devices that employ it and in accordance with the present invention could be made of any suitable flexible material for handling the flow of media, air, gas, liquid or other substrate of mixture thereof. For example, plastics and other related materials can be used. The various cells can be defined by separate units or those defined by dividing one large cell into multiple cells by welding, or the like.

It would be appreciated by those skilled in the art that various changes and modifications can be made to the illustrated embodiments without departing from the spirit of the present invention. All such modifications and changes are intended to be covered by the appended claims.

What is claimed is:

1. A family cell, comprising:

a first continuance cell;

a second continuance cell; the first continuance cell and the second continuance cell being in fluid communication autogeneously; media being self-contained within the family cell; the second continuance cell being configured and arranged to have an elastomeric advantage greater than the first continuance cell with the second continuance cell providing endogenous pressure to the media greater than the first continuance cell to the media at all times to return flow of the media to the first continuance cell autogeneously;

a first conduit connecting the first continuance cell to the second continuance cell;

a first one-way valve positioned in the first conduit and oriented to permit one-way flow of media from the first continuance cell to the second continuance cell;

a second conduit connecting the second continuance cell to the first continuance cell;

a second one-way valve positioned in the second conduit and oriented to permit one-way flow of media from the second continuance cell to the first continuance cell;

wherein the family cell provides a self-contained and controlled interminable circuit loop of media with a continuously variable, and renewable, continuance of pressure resistance.

2. The family cell of claim 1, wherein the continuance cells include individual, interchangeable, and interactive cells.

3. The family cell of claim 2, wherein the continuance cells are congruent or varying in size and shape with the same or different degree of capability.

4. The family cell of claim 1, whereby media is dynamically transferred to the first continuance cell by any one, combination, or sum of:

removal of the form of pressure resistance of an operator force, motorized, mechanical, computerized or other form of pressure resistance;

decreased pressure volume capability, unequal pressure volume capacity;

greater endogenous pressure of the second continuance cell; or a force selected from the group consisting of an operator force, motorized, mechanical, computerized, or other form of pressure resistance.

5. The family cell of claim 1, whereby media is dynamically transferred to the second continuance cell or by any one, combination, or sum of:

removal of the form of pressure resistance of an operator force, motorized, mechanical, computerized, or other form of pressure resistance;

decreased pressure volume capability, unequal pressure volume capacity;

greater endogenous pressure of the first continuance cell, or a force selected from the group consisting of an operator force, motorized, mechanical, computerized, or other form of pressure resistance.

6. The family cell of claim 1, further comprising:

at least one additional continuance cell fluidly interconnected to the first continuance cell and the second continuance cell by a pair of conduits and respective one-way valves therein to provide a self-contained and controlled interminable circuit loop of media with a continuously variable, and renewable, continuance of pressure resistance to more than two continuance cells; the first continuance cell, the second continuance cell and the at least one additional continuance cell having a different elastomeric advantage than each other.

* * * * *